US008720267B2

(12) United States Patent
Al-Buaijan (10) Patent No.: US 8,720,267 B2
(45) Date of Patent: May 13, 2014

(54) PARTIAL STROKE TESTING SYSTEM COUPLED WITH FUEL CONTROL VALVE

(76) Inventor: Tareq Nasser Al-Buaijan, Yarmok (KW)

(*) Notice: Subject to any disclaimer, the term of this patent is extended or adjusted under 35 U.S.C. 154(b) by 0 days.

(21) Appl. No.: 13/585,296

(22) Filed: Aug. 14, 2012

(65) Prior Publication Data

US 2012/0310582 A1    Dec. 6, 2012

Related U.S. Application Data

(63) Continuation of application No. 13/288,026, filed on Nov. 3, 2011, and a continuation-in-part of application No. 12/038,830, filed on Feb. 28, 2008, now Pat. No. 8,074,512.

(51) Int. Cl.
*F16K 37/00* (2006.01)

(52) U.S. Cl.
USPC .......................................................... 73/168

(58) Field of Classification Search
USPC ................... 73/1.72, 168; 251/16; 702/114
See application file for complete search history.

(56) References Cited

U.S. PATENT DOCUMENTS

| 4,192,489 | A | * | 3/1980 | Babich et al. ..................... 266/88 |
| 5,564,306 | A | * | 10/1996 | Miller ............................. 73/861 |
| 6,435,022 | B1 | * | 8/2002 | Albuaijan ........................ 73/168 |
| 6,935,610 | B1 | * | 8/2005 | DeBruyne ........................ 251/93 |
| 2001/0032518 | A1 | * | 10/2001 | Boger et al. ..................... 73/861 |
| 2005/0016254 | A1 | * | 1/2005 | Brown ............................ 73/1.17 |

OTHER PUBLICATIONS

Prior art cited in parent application U.S. Appl. No. 13/288,026, filed Nov. 3, 2011, the priority of which is claimed herein.

* cited by examiner

*Primary Examiner* — Hezron E Williams
*Assistant Examiner* — Nathaniel Kolb
(74) *Attorney, Agent, or Firm* — Richard C Litman (57) ABSTRACT

A system for on-line testing of an emergency shut-off valve includes a first emergency shut-off valve (first valve) and a flow control valve (second valve), with the system being configured to allow the second valve to serve as a combination flow control and second emergency shut-off valve. A subsystem is also provided for testing the first valve without fully closing the first valve in response to a signal from the control. In this subsystem, a solenoid valve bleeds off pressurized fluid to move the first valve from a fully opened to a partially closed position. A bypass around the second valve allows it to be tested as the second emergency shut-off valve, allowing the second valve to close completely without shutting down the process. The use of the two emergency shut-off valves in series wherein either valve can shut down the process provides a level 3 safety integrity level.

10 Claims, 3 Drawing Sheets

PARTIAL STROKE TESTING SYSTEM COUPLED WITH FUEL CONTROL VALVE

CROSS-REFERENCE TO RELATED APPLICATIONS

This application is a continuation of U.S. patent application Ser. No. 13/288,026, filed on Nov. 3, 2011, which is a continuation-in-part of U.S. patent application Ser. No. 12/038,830, filed on Feb. 28, 2008.

BACKGROUND OF THE INVENTION

1. Field of the Invention

This invention relates to a system for improving the Safety Integrity Level (SIL) rating of process heaters (e.g., industrial heating systems) using partial stroke testing of an emergency shut-off valve coupled to a supplementary fuel control valve.

2. Description of the Related Art

In the oil, gas, petroleum and power industries, natural gas or other combustible gas is often used to provide the required heat or combustion motive power for the desired operation, more generally referred to herein as a "process." Various conditions may occur that necessitate immediate shut down or tripping of the operations, process or plant. In those industries, a majority of the final control elements of a shut-off system are implemented with fast acting shut-off valves. In such industries, a majority of the shut-off valves remain open while the process is in a safe and controlled state. Such valves are closed only upon a plant trip, i.e., actuation of the shut-down system of the plant, arising from an out-of-control process or during a normal maintenance outage.

In practice, the testing of emergency shut-off valves is normally done during shut down of the process or plant operation. However, there is a tendency for such valves to stick or freeze due to corrosion or other reasons, which may lead to an unsafe condition where the valve cannot be closed during an emergency shutdown. This problem is exacerbated by economic conditions in the operation of the factory or plant that have lead to a reduction in the frequency of valve shut-offs for maintenance or testing purposes. For example, in some operations a process or operation may run continuously for one or more years without shutting down the process for maintenance.

State of the art emergency shut-off systems, which control the shut-off valves, have a number of features to detect plant or process failures and typically include redundancies for added reliability. However, such systems may not provide for the testing of a shut-off valve itself other than stroking the valve. The problem is that full stroking or completely closing the valve causes an undesirable disruption in the process.

A number of patents have been issued in the past that relate to the operation or stroking of industrial valves, and the increase of reliability in such systems. An example of such is found in U.S. Pat. No. 6,155,282, issued to Zachary et al., which discloses an arrangement for testing solenoids individually without process interruption. The arrangement operates in a two out of three manner to provide relatively high safety, low spurious tripping and a relatively low installation cost, while also enabling on-line testing of each solenoid individually without process interruption. Solenoid arrangements are preferably manifolded to facilitate maintenance on any detected failure, and to simplify installation and replacement.

A more recent U.S. Pat. No. 6,920,409, issued to Essam, discloses an apparatus for testing the operation of an emergency valve. As disclosed, the apparatus is for testing an emergency valve in which a valve member is moveable by a fluid operated actuator between a normally open or closed position and an emergency position, closed or open respectively. The apparatus comprises partial stroking means for the valve including means for initiating emergency movement of the valve from its normal position towards its emergency position, and means for returning it from a predetermined position intermediate the normal and emergency positions at its normal operating speed. The apparatus includes means for detecting the loss of the controlling electrical signal to the valve and a means for detecting the correct operation of the valve and its associated operating components by measuring the pressure of fluid being released from or being applied to the actuator.

In addition, U.S. Pat. No. 7,010,450, issued to Law et al., discloses a combination of field device operations with overrides and bypasses within a process control and safety system. The process control or safety instrumented system uses function block logic to coordinate the logic within the process control or safety instrumented system with operational states of field devices, even when these operational states are initiated externally to the process control or safety system. Logic within input or voter function blocks associated with field devices may monitor and determine when the associated field devices are being put into testing or calibration modes and may automatically initiate appropriate bypass or override functionality in response to such detected field device configuration states. Likewise, the function block logic may automatically remove the bypass or override functionality when the field devices are placed back into their normal operational configuration states. This automatic initiation of bypasses and overrides helps to prevent a safety system within a process plant from initiating a shut-down procedure as a result of a device test initiated manually by, for example, a handheld device attached to a field device. Likewise, the automatic removal of bypasses and overrides helps to prevent a safety system within a process plant from failing to operate properly because a user forgot to manually reset a bypass or override that was set up to allow a device test.

Recognizing that the emergency shut-off valves can be stroked or operated through the partial length or movement of their full travel as a safeguard against frozen or stuck valves has lead to a need for a simple, secure and reliable system for testing such valves without adversely affecting production. This approach also improves the safety of the operation.

The partial stroke testing system in accordance with my earlier invention, described in my U.S. Pat. No. 6,435,022, which is hereby incorporated by reference in its entirety, provides a low cost, simple and reliable test for emergency shut-off valves in the oil, gas, petrochemical and power industries. Such tests do not adversely interrupt the plant or factory operation or process and will minimize or almost eliminate the risk of a "frozen" emergency shutoff valve in the event of an out-of-control process or operation. Such a system is cost effective and has been designed to utilize a shut-off valve with a fast acting piston actuator. The system is also applicable to slow acting valves.

In processes in the oil, gas, petroleum, and power industries, fuel to power the heaters, boilers, or the like, or perhaps to provide fuel for a prime mover, is fed to the associated burners or other components through a fuel control valve and a fuel shut-off valve. The fuel control valve regulates pressure/flow to the burners, whereas the shut-off valve is normally in a fully open state. The shut-off valve closes to cut off fuel supply in the event of an emergency.

SUMMARY OF THE INVENTION

This invention relates to a system for improving the Safety Integrity Level (SIL) rating in processes or operations that employ burners fed by a combustible gas or fuel line using partial stroke testing of an emergency shut-off valve coupled to a supplementary fuel control, i.e., a second valve with a bypass for enabling the second valve to be fully closed for testing as a second emergency shut-off valve without interrupting the process. Such systems are particularly applicable in the oil, gas and petrochemical industries.

From the safety point of view, the shutoff action of the shutoff valve is of utmost importance in plant or factory operations or processes. The operability of the shutoff valve can be confirmed by means of the online valve partial stroke testing. However, any failure in the internals of the shut-off valve may lead to a fuel leakage to the heater or other component being supplied by the combustible gas or fuel passing through the valve(s). Introduction of a solenoid valve in the pneumatic circuit of the fuel control valve, in which the solenoid is driven by an emergency shut-off signal, is conceived as a means for supplementing the fuel shutoff action and the redundancy to achieve up to Safety Integrity Level Three (SIL-3) in plant or factory operations.

In addition, the partial stroke testing system in accordance with the present invention will not interfere with a plant trip, i.e., a full shut down due to an emergency condition. Furthermore, if a partial stroke test is being conducted at the time of a plant trip, the partial stroke test will contribute to a more rapid closing of the emergency shut-off valve. Thus, the partial stroking design acts as a backup to the main trip mechanism.

Accordingly, such systems should reduce the cost of insurance or risk coverage. In essence, the system partially closes the emergency shut-off valve to a predetermined position to test and confirm its ability to function and to ensure its availability on demand in the event of a plant emergency.

The present system design can be applied to design loop instrumentation (e.g., heater or boiler fuel loops, to piping loops, or to any separation between high pressure loops and low pressure loops) to achieve up to the Safety Integrity Level Three (SIL-3) in the final element (shutoff valve) part by using a regulator control valve as supplementary or second shutoff valve, as required by IEC (International Electrical and Electronic Commission)-61508 and ISA (Instrumentation, Systems, and Automation Society)S 84.01 standards.

TABLE 1

IEC 61598 Safety Integrity Levels

| Safety Integrity Level | Average Probability of Failure to Perform its Design Function on Demand |
|---|---|
| SIL-1 | $>10^{-1}$ to $\leq 10^{-2}$ (One failure in 11 to 100 demands) |
| SIL-2 | $>10^{-2}$ to $\leq 10^{-3}$ (One failure in 101 to 1000 demands) |
| SIL-3 | $>10^{-3}$ to $\leq 10^{-4}$ (One failure in 1001 to 10,000 demands) |

There is also a widespread concern among process operators about the Probability of Failure on Demand (PFD) of final shutdown elements, such as shut-off valves used in safety applications. Partial trip testing of the final shut-off valve coupled with the supplementary emergency shut-off valve according to the present invention will serve to improve the PFD rating of shut-off action in such systems. In Table 2, the first column represents parameters of interest, where MTTF is the mean time to failure, xv is the shut-off valve, cv is the control valve, Ti is the test interval, and PITT is partial instrument trip testing. The second column is the test interval (in years), and the PFD in the third column is the probability of failure on demand corresponding to the test interval in the second column.

TABLE 2

Utilizing shut-off (XV) with the control valve (CV) in 1oo2 configuration

| | Ti (CV) | PFD |
|---|---|---|
| MTTF (xv) = 35 years | 0.5 | 1.09E−4 |
| MTTF (cv) = 35 years | 1 | 1.14E−4 |
| Ti (XV) = 4 years | 2 | 1.31E−4 |
| Ti (CV) = 0.5, 1, 2, 3 years | 3 | 1.48E−4 |
| Diagnostic Coverage (CV) = 85% | | |
| Diagnostic Coverage (XV) = 80% | | |
| T(PITT) = 1 week | | |

A programmable logic scheme performs the function of controlling the actuation of the partial stroke of the shutoff valve system and the closing of the shutoff valve and the control valve in the event of an emergency shut-off trip, to achieve up to Safety Integrity Level Three (SIL-3).

The system is designed for implementation on an emergency shut-off valve, which is normally movable between a fully opened and a fully closed position, and a fuel control valve. The fuel control valve regulates pressure/flow to the burners or other component(s) using the gas, whereas the shut-off valve is normally in a fully open state. The shut-off valve closes to cut off fuel supply in the event of an emergency.

As contemplated by the preferred embodiment of the invention, the fuel control valve will be in a position between fully open and some regulated position and the emergency shut-off valve will be in its fully opened position during normal operation of a process or operation. Both valves will rapidly close to shut down the process in the event of an emergency.

The system is designed for interfacing to the plant emergency shut-off system controller for generating electrical signals for initiating a test of the valves and to a source of pressurized gas such as compressed air for driving the valve shut-off system.

The essential control components of an emergency shut-off valve are the main trip solenoid valve with manual reset, quick exhaust valve and a fluid actuator. The control components of the fuel control valve are a solenoid valve and a fluid signal from the 1/P converter to the actuator of the fuel control valve to accomplish the fuel regulating function.

On a trip signal the solenoid valve de-energizes, signaling the quick exhaust valve to vent the actuator and close the shut-off valve.

The invention provides a test means for testing the emergency shut-off valve without fully closing the emergency shut-off valve in response to a signal from the plant emergency shut-off system controller.

The test means includes a second solenoid valve for bleeding off compressed air to thereby move the emergency shut-off valve from a fully opened position to a partially closed position. Means such as a closure limit switch which may be operable on the basis of the movement of the shut-off valve, is provided.

Means such as a timer set to a predetermined time limit to terminate the shut-off valve test in the event of the limit switch failure is also provided.

In addition, means for initiating cyclic or periodic testing and reporting of test results of the partial stroking of the emergency shut-off valve is provided. During the partial stroke testing, the status of shutoff valves is displayed on the monitor of the Distribution Control System (DCS). Since the test loop is part of the distribution control system, this provides the opportunity to observe any changes, detect trends, set alarms, and store this data in memory. This system may be used with any of the facilities and with any of the capabilities provided by the emergency shut-down (ESD) and distribution control center (DCS) available in the control room. Also, this system will indicate the positional change and movement of the valve and can be recorded and used for maintenance as a diagnostic tool. The record may also be used for insurance approval. Finally, if the test of the partial stroke of the valve is correct, it will return to the same trend as stored in control system memory.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

It is well known in the oil, gas and petrochemical industries that emergency shut-off valves are susceptible to a build-up of frictional forces which if undetected can cause failure of the emergency shut-off valve during an out of control process or operation. Accordingly, the various regulatory agencies concerned with the safety of such operations mandate periodic shut-off valve testing and inspection in order to ascertain shut-off valve operability.

As disclosed herein, a partial stroke valve test system tests an emergency shut-off valve on-line, i.e., without shutting down the process, for free movement over a reduced portion of its full stroke. Therefore, tests can be performed at frequent intervals. By so doing, there is a high probability of ensuring the emergency shut-off valve's operability, which reduces the likelihood of failure of the emergency shut-off valve during extended runs.

In the oil, gas and petrochemical industries, emergency shut-off valves generally remain open while the operation or process is in a safe and controlled state. These valves close only upon a plant trip, i.e., the actuation of the emergency shutdown system of the factory or plant, which arises from an out of control process or operation. The emergency shut-off valve typically includes a pneumatic cylinder that drives the emergency shut-off valve into a fully closed position within about one second.

Figure 1:
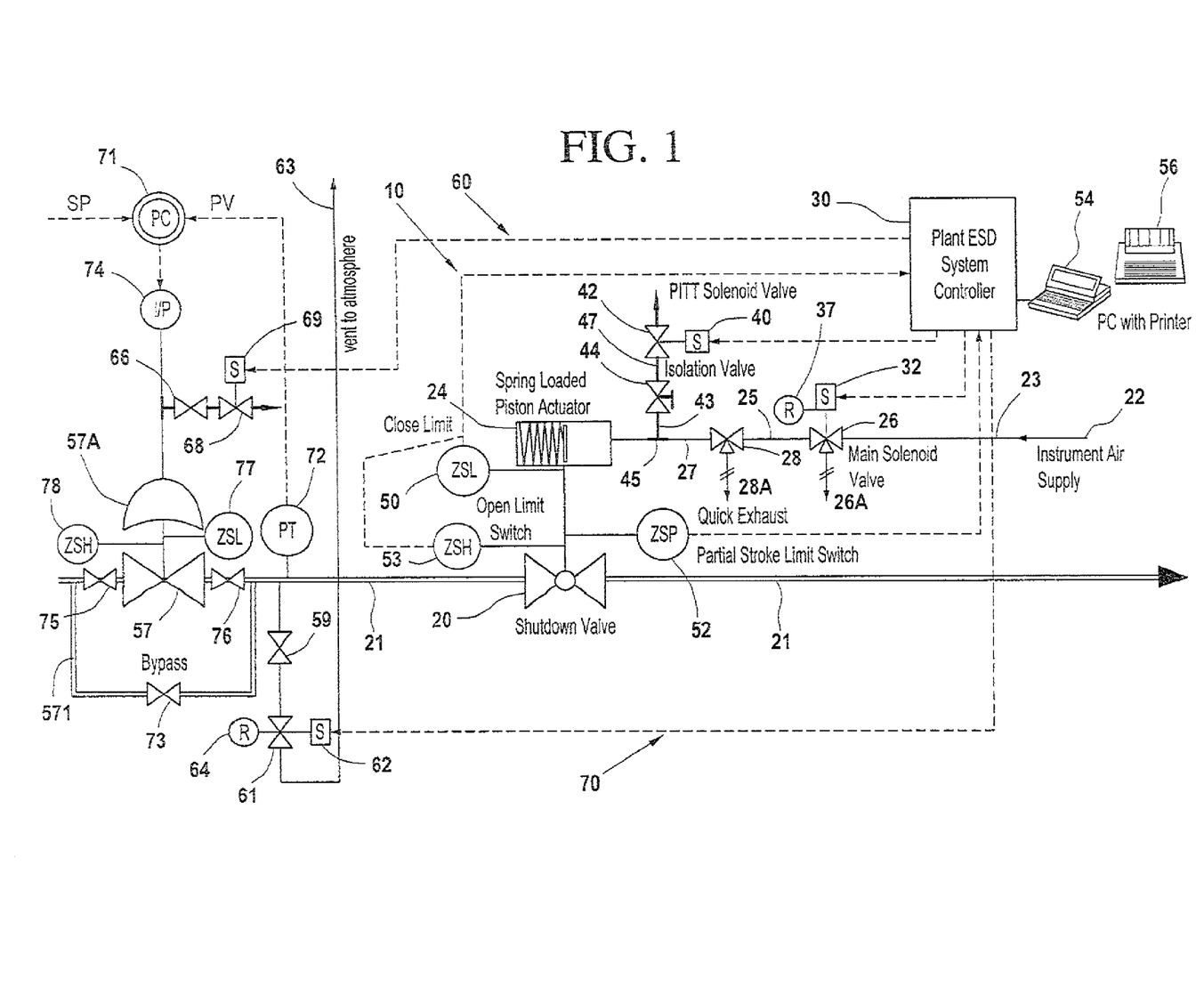
FIG. 1 is a schematic illustration of a partial stroke testing of a shutoff valve coupled with supplementary shutoff of a fuel control valve in accordance with a preferred embodiment of the invention.

The partial stroke testing system 10, incorporated with a shut-off valve for use in the oil, gas, petrochemical and power industries, is illustrated schematically in FIG. 1. Such a system includes an emergency shut-off valve 20 installed in series in a supply or delivery line 21 for the combustible gas used for the process(es) or operation(s) accomplished in the factory or plant. The emergency shut-off valve 20 remains in a fully open position during normal process conditions or operations. Compressed air or other gas from a source 22, e.g., conventional compressor or pressurized tank or container, etc., is used for maintaining the valve 20 in an open position. The compressed air or gas maintains the valve 20 in an open position by driving a spring biased piston actuator 24. The compressed air or gas flows through a pneumatic line or tubing 23 through a main solenoid valve 26 and line 25 to a quick exhaust valve 28, thence to the actuator 24 through the line 27.

In the event of a plant trip, i.e., an out of control process or operation, a signal as for example from the plant emergency shut-off system controller 30 actuates a solenoid 32 that closes the main solenoid valve 26 with respect to the pressurized air from the source 22 and allows the air or gas from tubing or line 25 to exhaust through an exhaust port 26A. The release of pressure against the quick exhaust valve 28 opens the exhaust port 28A allowing the actuator 24 to bleed through tubing 27, quick exhaust valve 28 and exhaust port 28A, thereby closing the shut-off valve 20 to shut down the flow of combustion gas for the process or operation of the plant or factory.

The partial stroke testing portion of the system 10 includes a second solenoid 40 and second solenoid valve 42. That portion also includes an isolation valve 44 that may be operated manually, as indicated by the manual control extending to the right of the isolation valve 44 in FIG. 1. The second solenoid valve 42 is operatively connected to the actuator 24 through pneumatic line or tubing 47, isolation valve 44, tubing or line 43 and "T" connection 45 through pneumatic line or tubing 27.

A combination flow control and shut-off valve 57 is also installed in the combustible gas supply line 21, in series with the previously discussed emergency shut-off valve 20. The valve 57 is shown to the lower left portion of FIG. 1. A valve actuator 57A operates the valve 57, controlling the valve 57 and thus regulates the flow of combustible gas therethrough for the plant or factory operation. A trip event will also actuate a third solenoid 69 (left portion of FIG. 1) by means of an electrical signal 60 from the system controller 30, which opens solenoid valve 68 to release the air pressure from the actuator 57A of the control valve 57, causing it to close the valve 57 completely as an emergency shut-off. The trip event or electrical signal 70 (lower portion of FIG. 1) from the emergency shut-off control 30 also actuates a fourth solenoid 62, which opens solenoid valve 61 to bleed the gas trapped between the control valve 57 and the shutoff valve 20 if there is any remote possibility of a leak from the control valve 57. Such combustible gas leakage (if any) is vented to the flare system 63, with the system terminating in a gas combustion port at the top or distal outlet end of the system 63 for any vented combustible gas. A manual reset 64 is provided to prevent an auto start before reset of the system, permitting operators of the system check it prior to restart.

Closure limit switch (ZSL) 77 and open limit switch (ZSH) 78 indicate the opening and closing of the control valve 57. During the trip event, closure limit switch 77 will be on, i.e., electrically closed or activated, and open limit switch 78 will be off, i.e., electrically open or inactive.

Isolation valves 59 and 66 provide isolation for solenoid valves 61 and 68, respectively, for maintenance requirements. The valves 59 and 61 are connected in series to the vent 63 and its distal gas combustion port to the atmosphere.

Valves 75, 76, and 73 are components of the bypass system to be used for any required maintenance of the control valve actuator 57A and control valve 57 or during a full stroke test of the valve 57. The control valve 57 also serves as a second emergency shut-off valve, as noted further above.

Process control (PC) 71, current to pressure converter (I/P) 74, and pressure transmitter (PT) 72 are part of the control process loop used in the petrochemical and power plant industries.

A key feature of the present invention resides in the use of the control valve 57 as a second emergency shut-off valve. A bypass 571 extends around the valve 57 in order to enable this function. In practice, the control valve 57 is provided in the combustible gas supply or delivery line 21 and is in series with the first emergency shut-off valve 20. The control valve 57 can be isolated from the system by the bypass 571 for fully stroking the control valve 57 for testing or to allow the control valve 57 to act as a second emergency shut-off valve. Valves 73, 75 and 76 are used to bypass the combination control valve and second emergency shutoff valve 57 so that the second emergency shutoff valve 57 can be fully stroked without shutting down the system. In such cases, the first emergency shutoff valve 20 fully protects the system in the event of an emergency. However, when the first emergency shut-off valve 20 is being tested, the control valve 57 serves as a second emergency shut-off valve to protect the plant or system in the event of a true emergency.

For a partial stroke test of the emergency shut-off valve 20, a signal from the plant emergency shut-off system controller 30 actuates the second solenoid 40, which opens the second solenoid valve 42 to bleed off compressed air from the actuator 24 and associated pneumatic lines or tubes so that the spring biased actuator 24 partially closes the shut down valve 20. This partial closing is limited by partial stroke limit switch 52, which sends a signal to plant emergency shut-off system controller 30 in a conventional manner. The plant emergency shut-off system controller 30 deactivates the solenoid 40 to thereby close the second solenoid valve 42 and the shut-off valve 20 returns to a fully open state. By limiting the movement of the shut down valve 20 by time or stroke, there is no interruption of the flow of gas through the supply or delivery line 21. Nevertheless the open limit switch 53 and partial stroke limit switch 52 provide signals to the plant emergency shut-off system controller 30 that the valve 20 actually moved, which indicate that it is not frozen or stuck. Suitable sensing means such as a conventional linear variable transducer can also be used to check that the valve 20 has in fact been displaced in response to the signal from the plant emergency shut-off system controller 30. If the linear variable transducer indicates that a preselected degree of deflection has occurred, the valve tested has been shown to be free to move.

However, if the sensing means indicates that the deflection has not occurred, a signal is sent to the plant emergency shut-off system controller 30 indicative of the fact. A suitable alarm is provided to indicate that the valve 20 is stuck and that corrective action should be initiated.

The magnitude of the displacement of the valve 20 may be any suitable degree to positively indicate that the valve movement is possible, but must not be of such magnitude as to disrupt the process or the plant operation and will ordinarily be accomplished in a few seconds or less.

The plant emergency shut-off system controller 30 may be interfaced to a computer 54 to initiate periodic partial stroking of the shut-off valve 20. The computer 54 is also used to record the results of each test, which may be printed out on a printer 56. The manually operated isolation valve 44 is used to isolate the second solenoid valve 42 from the shut-off valve system for maintenance without affecting the operation of the shut-off valve 20.

The manual latch facility 37 of the solenoid 32 of the main solenoid valve 26 allows the operators to manually open the shut-off valve 20, after field verification, subsequent to a trip and reset of the trip signal.

Figure 2:
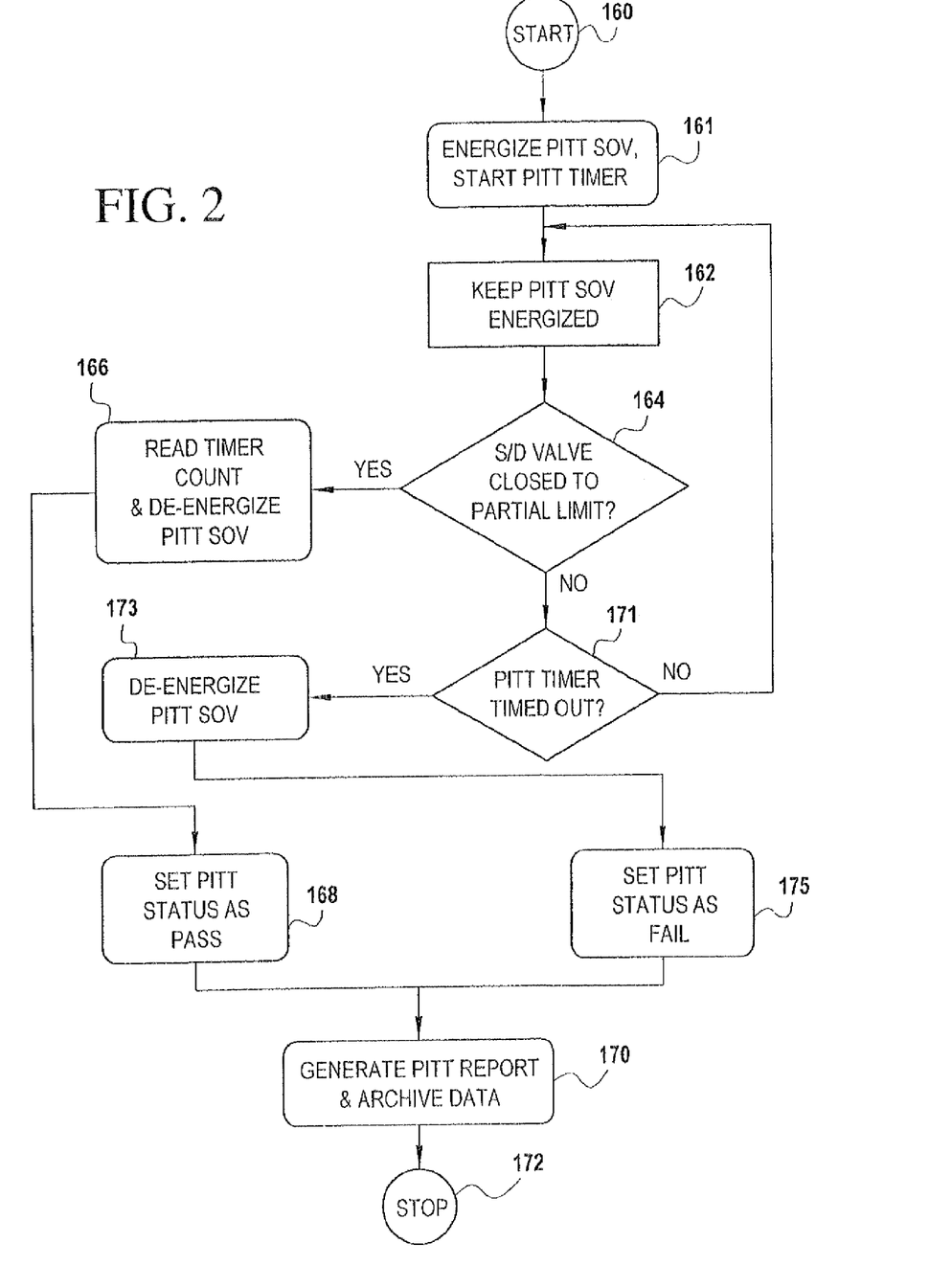
FIG. 2 is a flowchart that illustrates the operation of the partial stroke testing system software residing in the plant emergency shut-off system controller, in accordance with the present invention.

The control sequence for conducting the partial stroke test of the first shut-off valve 20 (FIG. 1), programmed into the plant emergency shut-off system controller 30 (FIG. 1), is illustrated in FIG. 2. The Partial Instrument Trip Testing (PITT) or partial stroking of the shut-off valve 20 is initiated by the plant emergency shut-off system controller 30 (FIG. 1) by initiating the execution of the program sequence illustrated in FIG. 2. Starting at step 160 the plant emergency shut-off system controller 30 (FIG. 1) energizes power supply to the solenoid 40 (FIG. 1) of the solenoid valve 42 (FIG. 1) and starts an internal timer as indicated in step 161. On energizing the solenoid 40 (in FIG. 1), the solenoid valve 42 (FIG. 1) opens and bleeds the actuator air supply, causing the actuator 24 (in FIG. 1) to move the shut-off valve 20 (FIG. 1) towards the closed position.

The shut-off valve movement to partial limit is checked in step 164. If the shut-off valve 20 (FIG. 1) has reached the partial limit, the program sequence proceeds to step 166 to de-energize the solenoid 40 (in FIG. 1) to close the solenoid valve 42 (FIG. 1) and to stop the timer. The actuator 24 (FIG. 1) on closure of the solenoid valve 42 (in FIG. 1) gets full air supply and drives the shut-off valve 20 (in FIG. 1) to its fully open position. The program sequence then proceeds to step 168 to indicate the status of the test as pass and to step 170 for generating a test report and archiving the test data. After generating the test report and archiving the test data (valve tag no., test status, test duration, and/or other data), the test control sequence is terminated at step 172 and diverted to other applications in the plant emergency shut-off system controller 30 (FIG. 1).

In the event that the shut-off valve 20 has not closed to its partial limit in step 164 and the test timer (PITT timer) has not timed out as in step 171, the control sequence returns to step 162 and loops through steps 164 and 171 until the valve 20 reaches the partial limit or the PITT timer times out.

In the event that the shut-off valve 20 has not closed to its partial limit in step 164 and the test timer (PITT timer) has timed out as in step 171, the control sequence goes to step 173 to de-energize the solenoid 40 (FIG. 1) to close the solenoid valve 42 (FIG. 1). The actuator 24 (FIG. 1) on closure of the solenoid valve 42 (FIG. 1) gets full air supply and drives the shut-off valve 20 (FIG. 1) to its fully open position. The program sequence then proceeds to step 175 to indicate the status of the test as fail and to step 170 for generating a test report and archiving the test data. After generating the test report and archiving the test data (valve tag no., test status, test duration, etc.), the test control sequence is terminated at step 172 and diverted to other applications in the plant emergency shut-off system controller 30 (FIG. 1).

The PITT solenoid valve 42 (FIG. 1) will remain energized, i.e., open, until the trip is reset. The additional bleed introduced by the solenoid valve 42 (FIG. 1) will enhance the shut-off performance of the shut-off valve 20.

A partial stroke testing system for on line testing of emergency shut off valves can also be implemented as a portable self contained test apparatus for conducting partial stroke tests on shut off valves which are controlled by non-programmable shut-off systems.

Figure 3:
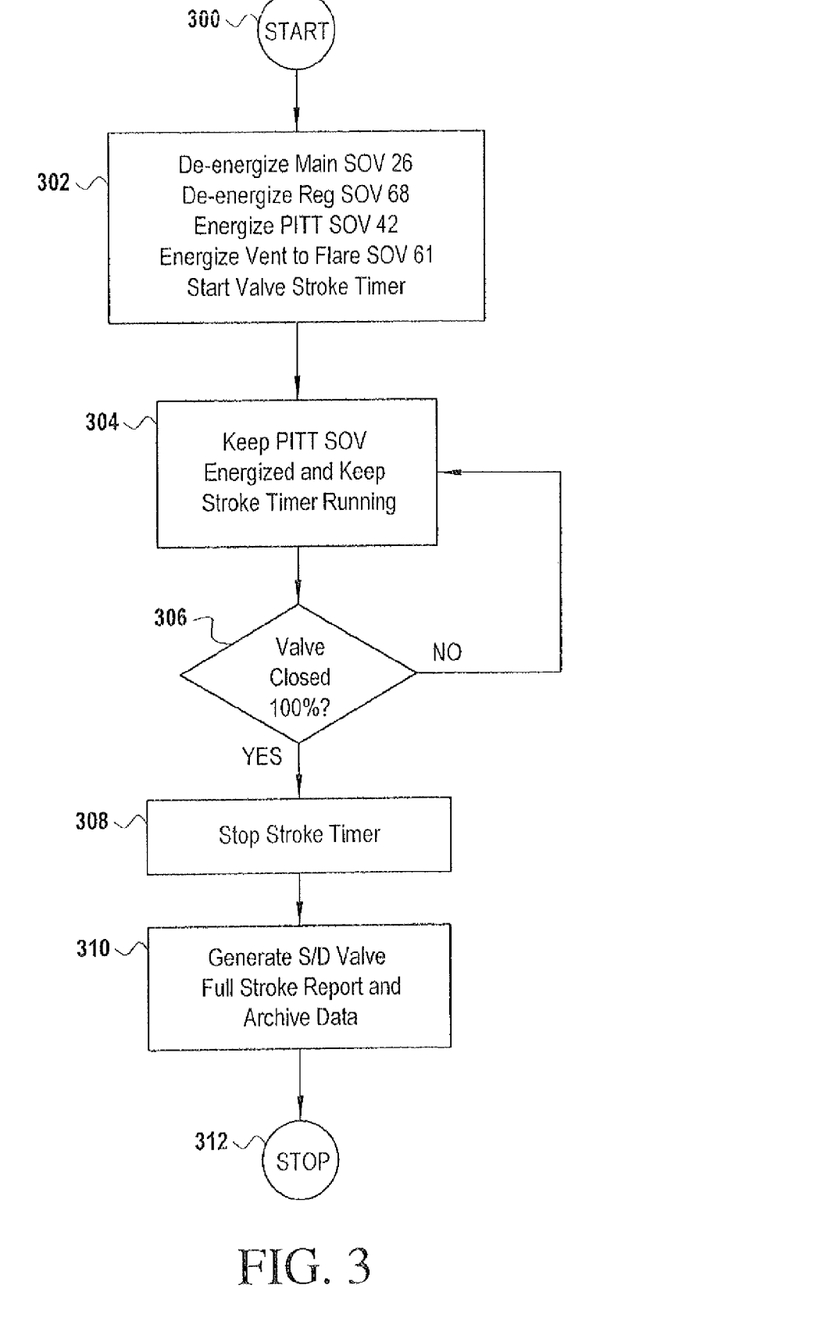
FIG. 3 is a flowchart that illustrates the operation of the software residing in the plant emergency shut-off system controller, controlling the partial stroking means in the event of an emergency trip signal from the plant emergency shut-off system controller in accordance with the present invention.

FIG. 3 of the drawings provides a flow chart that somewhat resembles that of FIG. 2. However, the flow chart of FIG. 3 encompasses the closure of both the shut-off valve 20 and the control or regulating valve 57, as would occur in a complete system shutdown. Following the initial start point 300 in FIG. 3, the three solenoid valves most critical to the operation of the shut-off valve 20 and the control or gas flow regulating valve, i.e., valves 26, 42, 68, and 61, are actuated, as indicated in the first step 302 of FIG. 3. This results in the loss of pneumatic pressure to the main shut-off valve actuator 24 as the main solenoid valve 26 closes, and the venting of pressure from the pressurized pneumatic line 27 to the actuator 24 as the Partial Instrument Trip Testing (PITT) valve 42 opens. The regulator solenoid valve 68 also opens to release pneumatic pressure from the control or regulator valve actuator 57A, thus resulting in the closure of the control or regulator valve 57. The vent solenoid 62 is also actuated to open the vent solenoid valve 61, in order to vent any residual gas and/or gas leakage in the main gas supply line 21 between the shutdown valve 20 and the control valve 57. The timer (included with the plant emergency shutdown system controller 30 of FIG. 1) is also started at this point, as indicated in step 302 of FIG. 3.

The operation continues as indicated in the following step 304 of the flow chart of FIG. 3 until the main shutdown valve 20 and the control or regulator valve 57 are completely closed (step 306 of FIG. 3). If the valves do not fully close within the period allotted by the timer, the system continues to attempt to close the valves, as indicated by the flow chart looping back from step 306 to step 304 in FIG. 3. Assuming that the two valves 20 and 57 do close completely, thereby shutting down the system, the stroke timer is stopped (step 308 of FIG. 3) and a report is generated (step 310 of FIG. 3). This terminates the shutdown program, as indicated by the final step 312 of FIG. 3.

Normally, the two solenoids 40 and 69 respectively for the main solenoid valve 26 and the regulator solenoid valve 68 receive continuous electrical power to hold the main solenoid valve 26 open and the regulator solenoid valve 68 closed. Cutting the electrical power to these two solenoids 40 and 69 will result in a reversal of state for their two valves, with the main solenoid valve 26 closing and the regulator solenoid valve 68 opening. However, no electrical power is normally supplied to the solenoids 40 and 62 respectively for the Partial Instrument Trip Testing (PITT) valve 42 and the vent solenoid valve 61, with those valves normally remaining closed. Transmittal of appropriate electrical power to actuate their two solenoids 40 and 62 results in the opening of the two valves 42 and 61, thereby venting pneumatic pressure from the shutdown valve actuator system and gas pressure from the combustion gas supply line 21 between the shutdown valve 20 and the control or regulator valve 57 to the vent 63 and its gas combustion port or flare. However, the system may be revised to obviate the need for electrical power to the two solenoids 40 and 69 and to require electrical power to the solenoids 40 and 62 for normal operation, if so desired.

Analysis of the above-described system as illustrated in the schematic drawing of FIG. 1 will demonstrate the redundancy of the valve system and the reliability thus provided for the system. It is not necessary for all three of the system valves, 26, 42, and 68 to operate in order to shut down the gas flow through the combustion gas delivery line 21. (As the vent or relief valve 61 does not actually control either the shutdown valve 20 or the combination control and shutdown valve 57 directly, it is not included in the discussion of the redundancy and reliability of the system.) Rather, the operation (closure or opening, as appropriate) of any one of the main solenoid valve 26, PITT or second solenoid valve 42, and regulator or third solenoid valve 68 will result in the closure of either the main shutdown valve 20 or the combination control (regulator) and shutdown valve 57. The table below illustrates the redundancy and corresponding reliability of the system.

TABLE 3

| System Reliability | | | |
| --- | --- | --- | --- |
| Shutdown Signal in Demand From Emergency Shutdown Controller | | | System Shutdown |
| Valve 26 | Valve 42 | Valve 68 | Status |
| 0 | 0 | 0 | 0 |
| 1 | 0 | 0 | 1 |
| 0 | 1 | 0 | 1 |
| 1 | 1 | 0 | 1 |
| 0 | 0 | 1 | 1 |
| 1 | 0 | 1 | 1 |
| 0 | 1 | 1 | 1 |
| 1 | 1 | 1 | 1 |

The above Table 3 illustrates the operation of the three valves 26, 42, and 68, and the resulting system shutdown when the valves operate. The number "1" indicates valve operation in each of the valve columns and corresponding system shutdown in the right hand "status" column. The character "0" indicates failure of valve operation and corresponding failure of the system to shut down, with system shutdown failure occurring only in the situation of the top row when all three valves fail to operate.

As an example of the above, consider the second row of binary characters. In this row, the main shutoff solenoid valve 26 has operated (closed), as indicated by the 1 in the Valve 26 column. However, the remaining two valves, i.e., the Partial Instrument Trip Testing (PITT) valve 42 and the control or regulator solenoid valve 68 are shown to be inoperative, i.e., remaining closed as indicated by the 0 character in their respective columns. In such a situation the control or regulator valve 57 would remain open, as the solenoid valve 68 controlling pneumatic pressure in this part of the system would remain closed, thus failing to vent the control pressure for the actuator 57A. The actuator 57A would thus continue to hold the control or regulator valve 57 open to allow gas flow therethrough. Also, the PITT valve 42 would not relieve the pneumatic pressure to the actuator 24 of the shutdown valve 20. However, the closure of the main solenoid valve 26 results in a loss of pneumatic pressure to the actuator 24, thus causing the actuator 24 to close the shutdown valve 20.

It will be seen that similar scenarios occur when any one of the three valves 26, 42, or 68 operate on demand to shut down the system, even though the other two valves fail to operate. This redundancy results in the desired system shutdown in $2^3-1$ scenarios, or seven out of eight scenarios, as can be seen in Table 3. The reliability provided thus meets or exceeds the standards required by Safety Integrity Level (SIL)-3, requiring no more than one failure in 1,001 to 10,000 demands.

In fact, the system reliability is even greater than that described above due to the operation of the vent control solenoid valve 61, serving to vent combustion gas from the portion of the gas delivery line 21 between the shutdown valve 20 and the control or regulator valve 57. When the vent control solenoid valve 61 operates according to demand, combustible gas in the delivery line 21 is vented through the vent 63 where it is discharged at the distal combustion port or flare of the vent line 63. While this per se is not sufficient to divert all combustion gas from the delivery line 21 if both the shutdown valve 20 and the control valve 57 remain open, the reduction of differential combustion gas pressure across the shutdown valve 20 relieves much of the stress on this valve, thus allowing it to operate more freely and more reliably. In addition, the opening of the vent control solenoid valve 61 serves to vent any combustion gas leakage past the control or regulator valve 57, in the event that this valve 57 has been signaled to close but remains slightly open to allow some of the combustion gas to pass therethrough. The venting of such residual combustion gas results in the control or regulator valve 57 serving as a supplementary or secondary shutdown valve, as practically no combustion gas will continue to flow past the vent control solenoid valve 61 even when the shutdown valve 20 remains open. Thus, it will be seen that the system of the present invention greatly enhances the reliability of gas delivery control and emergency shutdown systems as installed in various plants, factories, and similar facilities.

It is to be understood that the present invention is not limited to the embodiments described above, but encompasses any and all embodiments within the scope of the following claims.

I claim:

1. A partial stroke testing system coupled with fuel control valve, comprising:
    a combustion gas delivery line;
    a selectively operable gas shutoff valve disposed along the combustion gas delivery line;
    a selectively operable combination gas control and shutoff valve disposed along the combustion gas delivery line, the combination gas control and shutoff valve being disposed in series with the gas shutoff valve;
    a gas vent line extending from the gas delivery line and between the gas shutoff valve and the combination gas control and shutoff valve, the gas vent line having a distal end;
    a gas combustion port disposed at the distal end of the gas vent line;
    a gas vent valve disposed along the gas vent line for venting residual gas to the atmosphere via the gas combustion port;
    a control system for selectively automatically or manually substantially completely closing and reopening the gas shutoff valve;
    a control system for selectively automatically or manually partially closing and opening the gas shutoff valve;
    a control system for selectively automatically or manually substantially completely closing and reopening the combination gas control and shutoff valve;
    a combustion gas bypass line disposed in parallel about the combination gas control and shutoff valve;
    at least one selectively openable and closable bypass line shutoff valve disposed along the combustion gas bypass line;
    a gas shutoff valve actuator communicating pneumatically with the gas shutoff valve;
    a pneumatic pressure line communicating pneumatically with the gas shutoff valve actuator;
    a main solenoid valve disposed in the pneumatic pressure line, the main solenoid valve selectively controlling pneumatic pressure to the gas shutoff valve actuator;
    a pneumatic vent line communicating pneumatically with the pneumatic pressure line;
    a second solenoid valve disposed in the pneumatic vent line, the second solenoid valve selectively controlling pneumatic pressure in the pneumatic vent line;
    a combination gas control and shutoff valve actuator communicating with the combination gas control and shutoff valve;
    a current to pressure converter communicating pneumatically with the combination gas control and shutoff valve actuator;
    wherein the current to pressure converter includes regulating the fuel of a process control; and
    a third solenoid valve communicating pneumatically with the combination gas control and shutoff valve actuator;
    wherein closure of any one of the main solenoid valve, second solenoid valve, and third solenoid valve results in closure of one of the gas shutoff valve and combination gas control and shutoff valve.

2. The partial stroke testing system according to claim 1, further comprising:
    an emergency shut-off system controller communicating electronically with the main solenoid valve, the second solenoid valve, and the third solenoid valve;
    a computer communicating electronically with the emergency shut-off system controller; and
    the process control communicating pneumatically with the combination gas control and shutoff valve actuator.

3. The partial stroke testing system according to claim 1, further comprising:
    a first open limit switch, a first closure limit switch, and a partial stroke limit switch, each of the switches communicating with the gas shutoff valve and the emergency shut-off system controller; and
    a second open limit switch and a second closure limit switch, each of the second limit switches communicating with the combination gas control and shutoff valve and the emergency shut-off system controller.

4. A partial stroke testing system coupled with fuel control valve, comprising:
    a combustion gas delivery line;
    a selectively operable gas shutoff valve disposed along the combustion gas delivery line;
    a selectively operable combination gas control and shutoff valve disposed along the combustion gas delivery line, the combination gas control and shutoff valve being disposed in series with the gas shutoff valve;
    a control system for selectively automatically or manually substantially completely closing and reopening the gas shutoff valve;
    a control system for selectively automatically or manually substantially completely closing and reopening the combination gas control and shutoff valve;
    a gas vent line extending from the gas delivery line and between the gas shutoff valve and the combination gas control and shutoff valve, the gas vent line having a distal end;
    a gas combustion port disposed at the distal end of the gas vent line;
    a gas vent valve disposed along the gas vent line for venting residual gas to the atmosphere via the gas combustion port;
    a combustion gas bypass line disposed in parallel about the combination gas control and shutoff valve;
    at least one selectively openable and closable bypass line shutoff valve disposed along the combustion gas bypass line;
    a gas shutoff valve actuator communicating pneumatically with the gas shutoff valve;
    a pneumatic pressure line communicating pneumatically with the gas shutoff valve actuator;
    a main solenoid valve disposed in the pneumatic pressure line, the main solenoid valve selectively controlling pneumatic pressure to the gas shutoff valve actuator;

a pneumatic vent line communicating pneumatically with the pneumatic pressure line;

a second solenoid valve disposed in the pneumatic vent line, the second solenoid valve selectively controlling pneumatic pressure in the pneumatic vent line;

a combination gas control and shutoff valve actuator communicating with the combination gas control and shutoff valve; and a third solenoid valve communicating pneumatically with the combination gas control and shutoff valve actuator;

wherein closure of any one of the main solenoid valve, second solenoid valve, and third solenoid valve results in closure of one of the gas shutoff valve and combination gas control and shutoff valve;

an emergency shut-off system controller communicating electronically with the main solenoid valve, the second solenoid valve, and the third solenoid valve;

a computer communicating electronically with the emergency shut-off system controller; and a process control and a current to pressure converter communicating pneumatically with the combination gas control and shutoff valve actuator;

wherein the current to pressure converter includes regulating the fuel of the process control.

5. The partial stroke testing system according to claim 4, further comprising a control system for selectively automatically or manually partially closing and opening the gas shutoff valve.

6. The partial stroke testing system according to claim 4, further comprising:
   a first open limit switch, a first closure limit switch, and a partial stroke limit switch, each of the switches communicating with the gas shutoff valve and the emergency shut-off system controller; and
   a second open limit switch and a second closure limit switch, each of the second switches communicating with the combination gas control and shutoff valve and the emergency shut-off system controller.

7. A partial stroke testing system coupled with fuel control valve, comprising:
   a combustion gas delivery line;
   a selectively operable gas shutoff valve disposed along the combustion gas delivery line;
   a selectively operable combination gas control and shutoff valve disposed along the combustion gas delivery line, the combination gas control and shutoff valve being disposed in series with the gas shutoff valve;
   a gas vent line extending from the gas delivery line and between the gas shutoff valve and the combination gas control and shutoff valve, the gas vent line having a distal end;
   a gas vent valve disposed along the gas vent line; and
   a gas combustion port disposed at the distal end of the gas vent line;
   a control system for selectively automatically or manually substantially completely closing and reopening the gas shutoff valve;
   a control system for selectively automatically or manually substantially completely closing and reopening the combination gas control and shutoff valve;
   a combustion gas bypass line disposed in parallel about the combination gas control and shutoff valve;
   at least one selectively openable and closable bypass line shutoff valve disposed along the combustion gas bypass line;
   a combination gas control and shutoff valve actuator communicating with the combination gas control and shutoff valve;
   a current to pressure converter communicating pneumatically with the combination gas control and shutoff valve actuator;
   wherein the current to pressure converter includes regulating the fuel of a process control; and
   a control system for partially closing and opening the gas shutoff valve on demand;
   wherein the on demand of said control system for partially closing and opening the gas shutoff valve being selectively chosen between automatically and manually.

8. The partial stroke testing system according to claim 7, further comprising:
   a gas shutoff valve actuator communicating pneumatically with the gas shutoff valve;
   a pneumatic pressure line communicating pneumatically with the gas shutoff valve actuator;
   a main solenoid valve disposed in the pneumatic pressure line, the main solenoid valve selectively controlling pneumatic pressure to the gas shutoff valve actuator;
   a pneumatic vent line communicating pneumatically with the pneumatic pressure line;
   a second solenoid valve disposed in the pneumatic vent line, the second solenoid valve selectively controlling pneumatic pressure in the pneumatic vent line;
   a combination gas control and shutoff valve actuator communicating with the combination gas control and shutoff valve; and
   a third solenoid valve communicating pneumatically with the combination gas control and shutoff valve actuator;
   wherein closure of any one of the main solenoid valve, second solenoid valve, and third solenoid valve results in closure of one of the gas shutoff valve and combination gas control and shutoff valve.

9. The partial stroke testing system according to claim 8, further comprising:
   an emergency shut-off system controller communicating electronically with the main solenoid valve, the second solenoid valve, and the third solenoid valve;
   a computer communicating electronically with the emergency shut-off system controller; and
   the process control communicating pneumatically with the combination gas control and shutoff valve actuator.

10. The partial stroke testing system according to claim 8, further comprising:
    a first open limit switch, a first closure limit switch, and a partial stroke limit switch, each of the switches communicating with the gas shutoff valve and the emergency shut-off system controller; and
    a second open limit switch and a second closure limit switch, each of the second switches communicating with the combination gas control and shutoff valve and the emergency shut-off system controller.

* * * * *